(12) United States Patent
Nishi et al.

(10) Patent No.: US 8,601,906 B2
(45) Date of Patent: Dec. 10, 2013

(54) MACHINE TOOL

(75) Inventors: Syuichi Nishi, Yamatokoriyama (JP); Shigetsugu Sakai, Yamatokoriyama (JP); Masahiro Yamane, Yamatokoriyama (JP)

(73) Assignee: Mori Seiki Co., Ltd., Yamatokoriyama-Shi (JP)

( * ) Notice: Subject to any disclaimer, the term of this patent is extended or adjusted under 35 U.S.C. 154(b) by 1419 days.

(21) Appl. No.: 11/978,731

(22) Filed: Oct. 30, 2007

(65) Prior Publication Data

US 2008/0168860 A1     Jul. 17, 2008

(30) Foreign Application Priority Data

Jan. 11, 2007   (JP) ................................. 2007-003834

(51) Int. Cl.
*B23Q 11/08* (2006.01)

(52) U.S. Cl.
USPC .............................. 74/616; 451/451; 409/134

(58) Field of Classification Search
USPC ............. 74/608, 612, 616; 409/134; 451/451, 451/455; 82/117, 152; 49/50, 56, 61, 62, 49/63, 125; D15/130
IPC ....................................................... B23Q 11/08
See application file for complete search history.

(56) References Cited

U.S. PATENT DOCUMENTS

| | | | | |
|---|---|---|---|---|
| 284,117 A * | 8/1883 | Byar | ................................ | 160/91 |
| 3,906,669 A * | 9/1975 | Vorguitch | ....................... | 49/372 |
| 4,797,989 A * | 1/1989 | Cherko | ............................ | 483/14 |
| 4,999,895 A * | 3/1991 | Hirose et al. | ................... | 29/33 P |
| 5,342,156 A * | 8/1994 | Baba | .............................. | 409/134 |
| 5,871,312 A * | 2/1999 | Haninger et al. | ............. | 409/134 |
| 5,897,430 A * | 4/1999 | Haller | ........................... | 451/451 |
| 5,960,690 A * | 10/1999 | Romi | ................................ | 82/133 |
| 6,662,685 B2 * | 12/2003 | Kuriki et al. | .................... | 74/612 |
| 6,796,206 B2 * | 9/2004 | Li | .................................... | 82/117 |
| 6,987,241 B2 * | 1/2006 | Hacker et al. | ............ | 219/121.86 |

FOREIGN PATENT DOCUMENTS

| | | |
|---|---|---|
| JP | 5-074744 U | 10/1993 |
| JP | 05-293739 A | 11/1993 |
| JP | 2002-096239 A | 4/2002 |
| JP | 2002-147091 A | 5/2002 |
| JP | 2002-256771 A1 | 9/2002 |
| JP | 2002-370136 A | 12/2002 |
| JP | 2004-162421 A | 6/2004 |
| JP | 3103602 U | 6/2004 |

OTHER PUBLICATIONS

Office Action issued by Japan Patent Office, directed to Japan Patent Application No. 2007-003834.

* cited by examiner

*Primary Examiner* — Thomas Diaz

(74) *Attorney, Agent, or Firm* — Smith Patent Office

(57) ABSTRACT

A machine tool capable of eliminating a laborious attachment/detachment work of a cover member is provided. The machine tool includes a door device 5 having a first door 6 to cover a machining-area opening 3*e* when machining a workpiece and a second door 7 to cover the machining-area opening 3*e* when not machining the workpiece and formed to be visible an inside thereof, in which the first door 6 and the second door 7 are arranged in a movable manner between a position-in-use covering the machining-area opening 3*e* and a position when opened opening the machining-area opening 3*e*.

5 Claims, 8 Drawing Sheets

MACHINE TOOL

BACKGROUND OF THE INVENTION

1. Field of the Invention

The present invention relates to a machine tool including a machine body machining a workpiece, a machine body cover covering a periphery of the machine body, and a door device capable of opening/closing a machining-area opening formed in the machine body cover.

2. Description of the Related Art

In machine tools such as a lathe, a structure, in which the periphery of a machine body is surrounded by a machine body cover provided with a machining-area opening a machining area to be machined to outside and the machining-area opening is covered by a door in an openable/closable manner, is adopted.

It is designed to prevent the workpiece from jumping to outside by covering the machining-area opening by the door, even when the workpiece is disengaged from a chuck in the course of the machining. In conventional machine tools, in general, a window is provided in the above-described door so that the inside status of the machining area can be observed from outside when machining the workpiece (for example, refer to Patent document 1).

[Patent document 1] Utility Model Registration No. 3103602

Meanwhile, since the above-described door is needed to be formed staunch enough to endure and not to break even when the workpiece jumps out to give a blow, the window to observe the inside is forced to be set to have the smallest size. Therefore, for example, it is limited to observe the inside status of the machining area sufficiently even at the non-machining time in which a spindle has no workpiece attached thereto.

Therefore, in the conventional machine tools, when rotating the spindle having no workpiece attached thereto, there is sometimes a case where the machining-area opening is opened by the door slid in the lateral direction and, at the same time, a separate cover member having an attachable/detachable structure is attached to the machining-area opening to thereby allow the observation of the inside during the rotation of the spindle. Here, the cover member is used in the state when having no workpiece attached, in which no blow will be given by the workpiece, so that the cover member is not necessary be so staunch in structure. Therefore, the window can be formed to have a larger size, so that the inside can be observed easily and surely.

However, in the case of the structure where the cover member is attached to the machining-area opening, the attaching/detaching work of the cover member is laborious and a space to dispose the detached cover member is additionally required, leaving problems.

SUMMARY OF THE INVENTION

The present invention has been made in view of the above-described problems, and an object thereof is to provide a machine tool capable of eliminating a laborious attaching/detaching work of a cover member as described above.

In the present invention, a machine tool includes: a machine body machining a workpiece; a machine body cover surrounding a periphery of the machine body; a machining-area opening formed in the machine body cover and opening a machining area of the machine body; and a door device opening/closing the machining-area opening, in which the door device includes a first door to cover the machining-area opening when machining the workpiece and a second door to cover the machining-area opening when not machining the workpiece, the second door being formed to be visible inside thereof, and in which the first door and the second door are arranged in a freely movable manner between a position-in-use covering the machining-area opening and a position when opened opening the machining-area opening.

In the present invention, two doors, namely the first door to cover the machining-area opening when machining the workpiece and the second door to cover the machining-area opening when not machining the workpiece, are arranged in a movable manner between the position used to cover the machining-area opening and the position used to open the machining-area opening to outside, so that the machining-area opening can be covered as well as opened to outside with a necessary door by a simple operation of moving either or both of the first door or/and the second door.

Specifically, for example, when machining, even if the workpiece is disengaged to jump out, it is possible to prevent the workpiece from jumping to outside by covering the machining-area opening with the first door. Further, when rotating the spindle without attaching the workpiece thereto, it is possible to observe the inside by covering the machining-area opening with the second door. Furthermore, when exchanging the workpiece and the like, by moving both the doors to the positions for opening the machining-area opening, it is possible to exchange the workpiece or a tool, or to maintain the machine easily and surely. Note that, even when machining the workpiece, the machining is performed, for example at a low-level speed not possibility causing the workpiece to jump to outside, it is possible to observe the machining state by covering the machining-area opening with the second door.

As described above, compared with the conventional structure in which the separate cover member is attached to the machining-area opening in an attachable/detachable manner, the workability of the opening/closing work of the machining-area opening can be improved highly.

Further, a space to accommodate the cover member, which is necessary in the case of the conventional structure employing the cover member having an attachable/detachable structure, is not necessary.

In a preferred embodiment of the present invention, the first door and the second door are disposed in a slidable manner in the lateral direction and the second door is disposed outside the first door.

In the embodiment describing the above characteristics, the first door and the second door are disposed in a slidable manner in the lateral direction, so that both the doors can be moved by small operational force. In other words, for example, in the case of the structure where the doors are moved in the vertical (up and down) direction, the operational force increases to the extent of the weight of the doors, requiring a larger support mechanism for the operational force.

Further, since the second door is disposed outside the first door, the first door and the second door can be disposed and moved without interfering each other, so that the above-described workability can be improved further. Specifically, for example, when both the doors are disposed to form the same plane, both the doors are restricted in view of a position to be disposed and a moving direction, for example, when the first door is disposed on the left side of the machining-area opening in a movable manner, the second door is requisitely disposed on the right side thereof in the movable manner.

In another preferred embodiment of the present invention, the positions of the first door and the second door when opening the machining-area opening are set on the same side of the machining-area opening.

In the embodiment describing the above-described characteristics, the positions of the first door and the second door when opening the machining-area opening are set on the same side of the machining-area opening, so that the opposite side thereto over the machining-area opening can be utilized, for example, as a space to dispose an operation panel while providing both the first door and the second door.

DETAILED DESCRIPTION OF THE PREFERRED EMBODIMENTS

Figure 1:
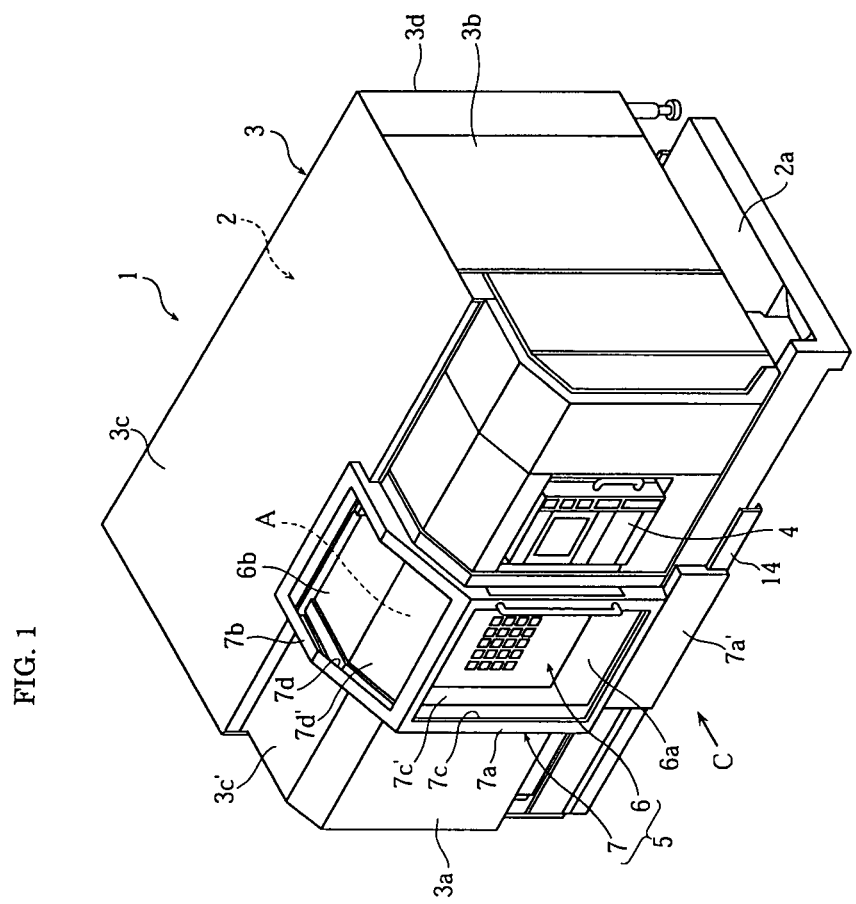
FIG. 1 is a front perspective view of a lathe provided with a door device according to an embodiment of the present invention.

Hereinafter, an embodiment of the present invention will be described with reference to the attached drawings. FIG. 1 to FIG. 8 are views to illustrate a machine tool according to a first embodiment of the present invention. Note that, in the present embodiment, front, rear, right and left are the states when viewed from a machine front C, meaning a near side, a distant side, a right side and a left side, respectively.

In these drawings, a numerical reference "1" denotes a lathe (machine tool) including a machine body 2 to machine a workpiece and a machine body cover 3 surrounding the periphery of the machine body 2. At almost the center in the right and left direction of the machine body 2, a machining area "A" to machine the workpiece is formed by a spindle (not shown) disposed on a bed 2a and a plurality of tool posts 2b, 2c.

The machine body cover 3 includes a front cover portion 3a, right and left side face cover portions 3b, 3b, a top face cover portion 3c and a back face cover portion 3d covering a front face, right and left side faces, a top face and a back face of the machine body 2, respectively.

A machining-area opening 3e is formed in those portions of the front cover portion 3a and a front portion 3c' of the top face cover portion 3c that correspond to the machining area "A". This machining-area opening 3e allows the front and the upside of the machining area "A" to be opened. It is therefore possible to observe the status of the workpiece, which is being machined by the spindle or the tool posts 2b, 2c, through this machining-area opening 3e, and it is also designed to attach/detach the workpiece to/from the spindle, to attach/detach tools to/from the tool posts 2b, 2c, or to perform another maintenance through this machining-area opening 3e. Note that "4" denotes an operation panel to set a machining program, to monitor a machining status, and so forth and is arranged at the right side of the machining-area opening 3e of the front cover portion 3a.

A door device 5 to open/close the machining-area opening 3e is arranged in an extending manner from the front face of the machining-area opening 3e to the upper face thereof. This door device 5 includes: a first door 6 to cover the machining-area opening 3e when machining the workpiece, or a machining time, and a second door 7 to cover the machining-area opening 3e when not machining the workpiece, or a non-machining time.

The first door 6 includes a vertical wall portion 6a opening/closing the front face of the machining-area opening 3e and a horizontal wall portion 6b extending continuously from the upper edge of the vertical wall portion 6a toward the distant side of the machine while bending and opening/closing the upper face of the machining-area opening 3e. In the vertical wall portion 6a, a plurality of small windows 6c each having a transparent plate 6c' attached thereto are formed. Since the first door 6 is to cover the machining-area opening 3e when machining the workpiece as described before, it should have sufficient strength and rigidity of a level not broken by the workpiece even when the workpiece is disengaged from the chuck, and therefore, its window to observe the inside is formed as the small windows 6c each having a small area as described above.

A pulley 8 is mounted to a lower edge portion 6a' of the first door 6 in a freely rotatable manner around a rotary shaft extending in the horizontal direction. The pulley 8 is provided with a V-groove 8a in the outer circumference thereof and the V-groove 8a is supported by a guide rail 9 in a freely rotatable manner. The guide rail 9 is secured via a bracket 9a to an inner surface of a lower edge portion 3a' of the front cover portion 3a composing a lower edge of the machining-area opening 3e.

Further, a roller 10 is mounted to a distant edge portion of the horizontal wall portion 6b of the first door 6 via a bracket 6b' in a freely rotatable manner around a rotary shaft extending in the vertical direction. The roller 10 is designed to move in a rolling manner in a guide groove "a" formed by an end surface 3f of an opening edge portion 3f of the top face cover portion 3c composing a distant edge of the machining-area opening 3e and a guide plate 11 secured to the opening edge portion 3f.

In this manner, the first door 6 is structured to be slidable in the lateral direction between the position-in-use covering the machining-area opening 3e and the position when opened opening the machining-area opening 3e, which is positioned at the left side thereof.

The second door 7 includes a vertical wall portion 7a opening/closing the front face of the machining-area opening 3e and a horizontal wall portion 7b extending continuously from the upper edge of the vertical wall portion 7a toward the distant side of the machine while bending and opening/closing the upper face of the machining-area opening 3e. The second door 7 is to cover the machining-area opening 3e when not machining the workpiece, namely when the chuck of the spindle does not hold the workpiece as described above, so that the second door 7 will not be broken by the workpiece. Therefore, the second door 7 includes a vertical wall window 7c and a horizontal wall window 7d each having an area sufficient enough to observe the inside, and the windows 7c, 7d have transparent plates 7c', 7d' attached therein, respectively.

A linear guide 12 is attached to a lower edge 7a' of the second door 7 and is supported by a linear guide rail 13 in a freely slidable manner in the right and left direction. The linear guide rail 13 is secured to a lower edge 3a' of the front cover portion 3a via a bracket 14.

Further, a linear guide 15 is mounted to a distant edge portion 7b' of the second door 7 via the bracket 14. The linear guide 15 is supported by a linear guide rail 16 in a freely slidable manner in the right and left direction, and the linear guide rail 16 is secured to the opening edge portion 3f of the top face cover portion 3c.

The second door 7 is slidable in the lateral direction between the position-in-use covering the machining-area opening 3e and the position when opened opening the machining-area opening 3e and at the left thereof by the above-described supporting structure.

Figure 3:
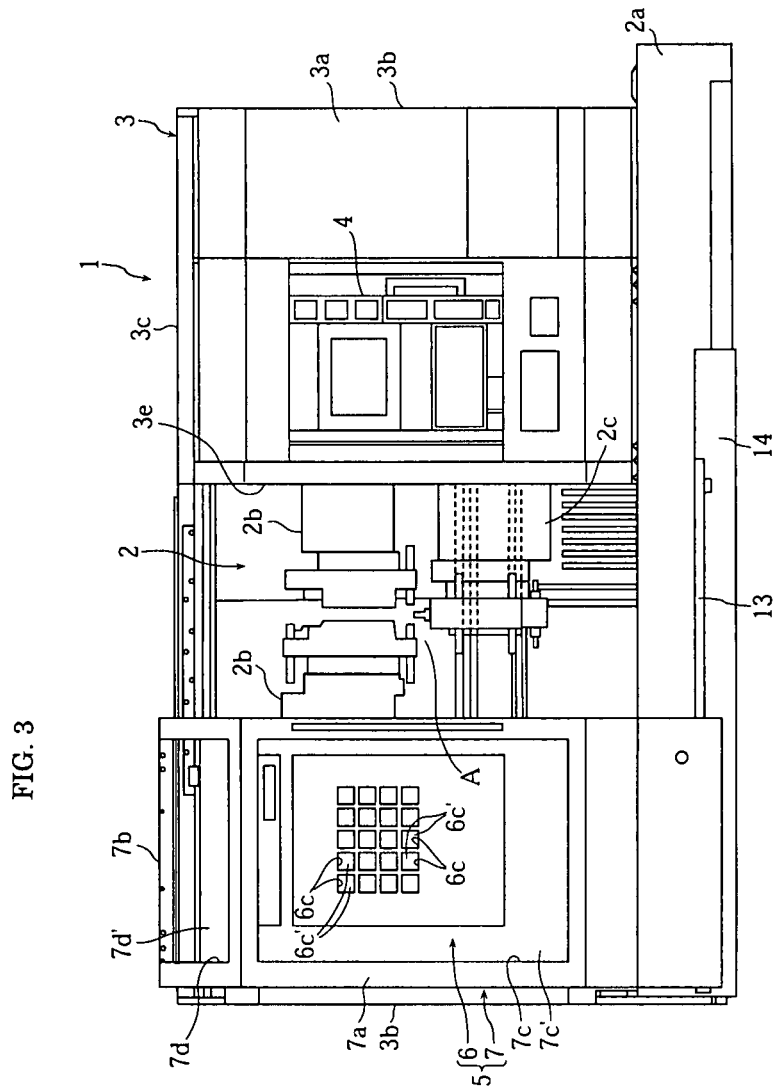
FIG. 3 is a front view of the lathe when performing an attaching/detaching work of the workpiece.
Figure 4:
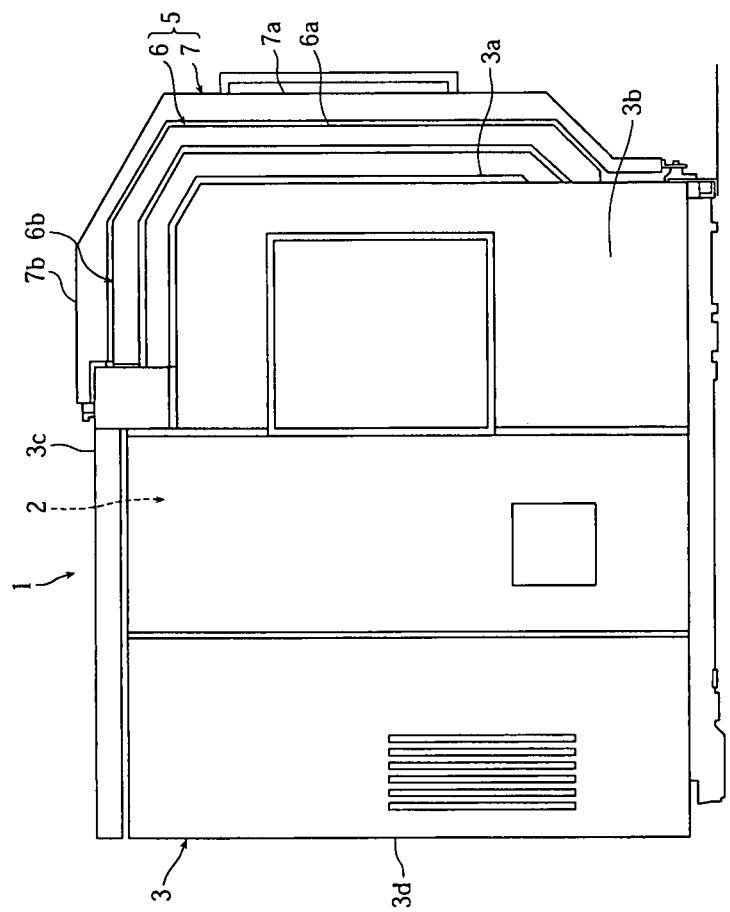
FIG. 4 is a left side view of the lathe.
Figure 5:
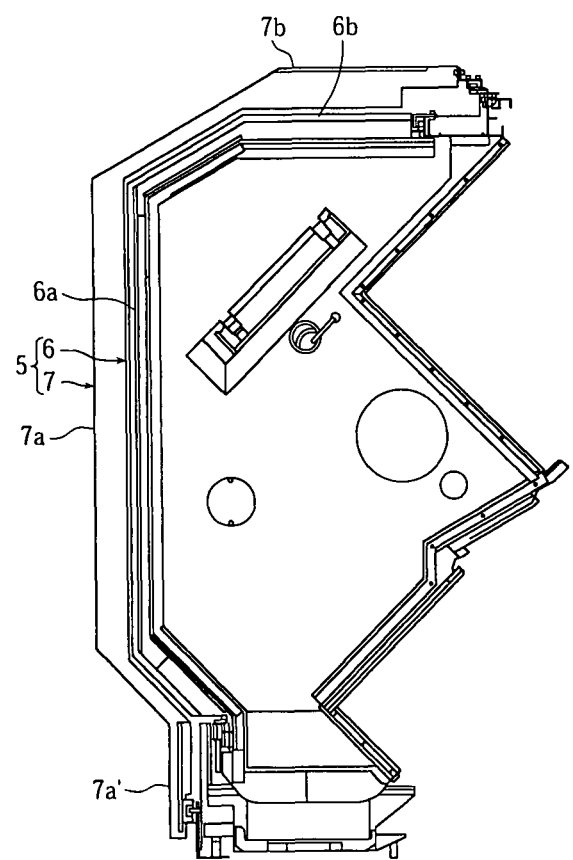
FIG. 5 is a right-side sectional view of the door device.
Figure 6:
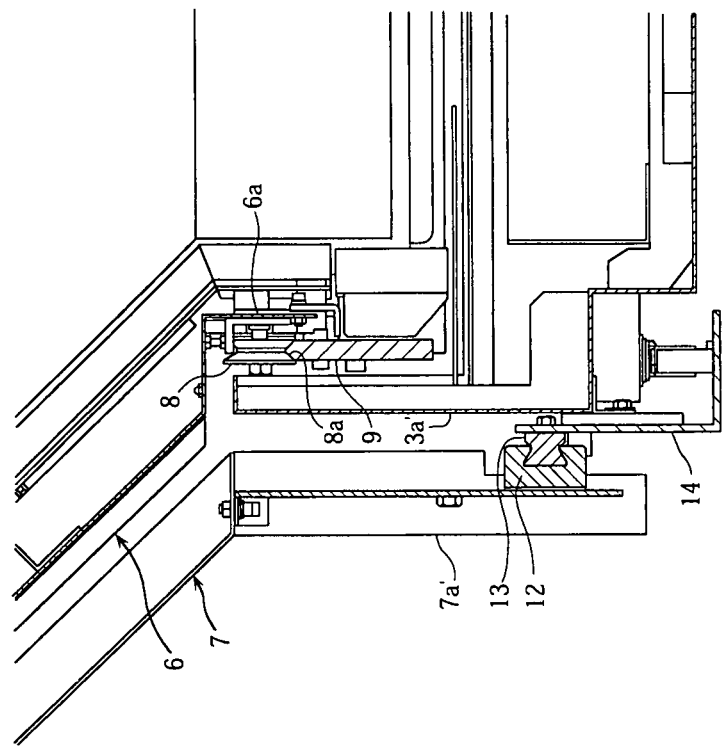
FIG. 6 is a right-side sectional view showing a supporting structure of a lower end portion of the door device.
Figure 7:
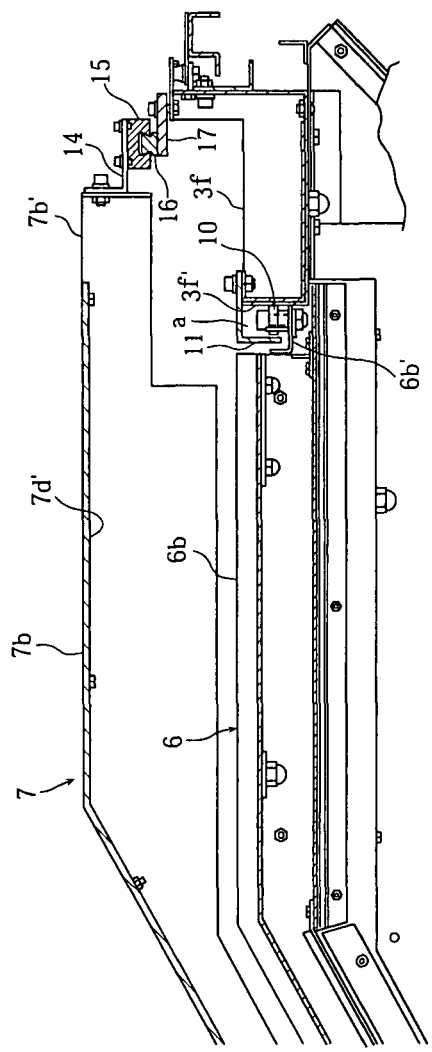
FIG. 7 is a right-side sectional view showing a supporting structure of an upper end portion of the door device.
Figure 8:
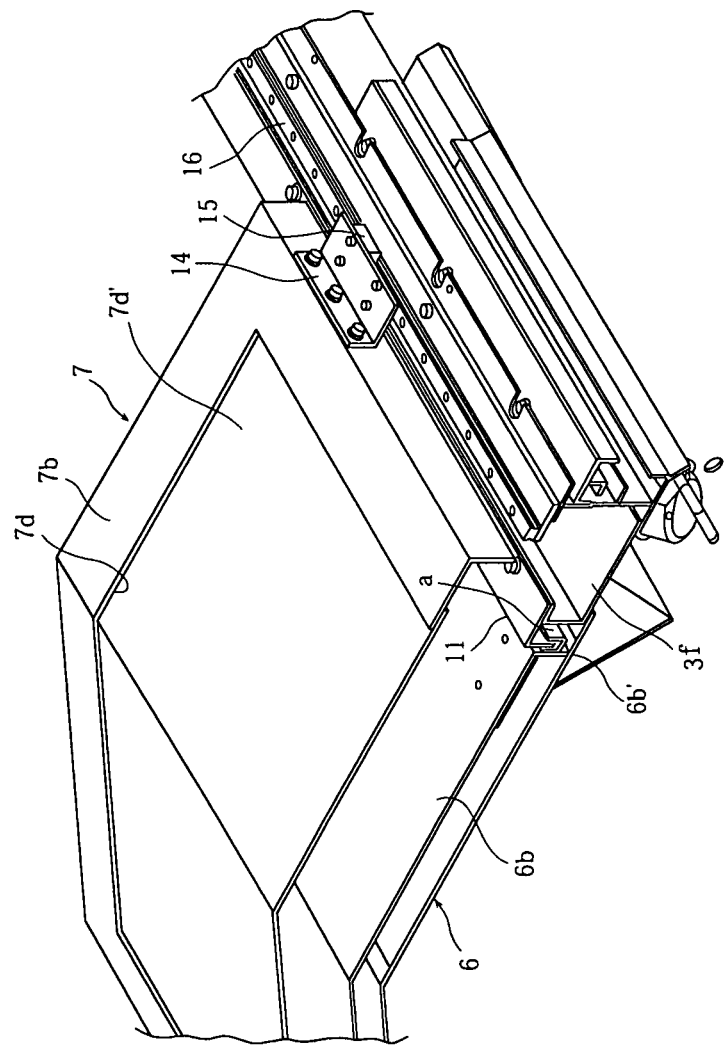
FIG. 8 is a perspective view showing the supporting structure of the upper end portion of the door device.

In the lathe 1 according to the present embodiment, the first door 6 and the second door 7 of the door device 5 are slid to the left side (the position when opened) of the machining-area opening 3e to open the machining-area opening 3e to front and upside, and the attachment/detachment work of the workpiece to/from the chuck of the spindle and the maintenance work such as the attachment/detachment work of the tools to/from the tool posts 2b, 2c, respectively, and the like are performed in this state (refer to FIG. 3).

When machining the workpiece, the first door 6 is moved to the position-in-use covering the machining-area opening 3e and, in some cases, the second door 7 is moved to the position-in-use covering the machining-area opening 3e as well (refer to FIG. 1).

In that case, since the first door 6 is formed to be highly strong and rigid, the workpiece in no case jumps out to outside by breaking the first door 6 even when the workpiece is disengaged during the machining thereof.

Figure 2:
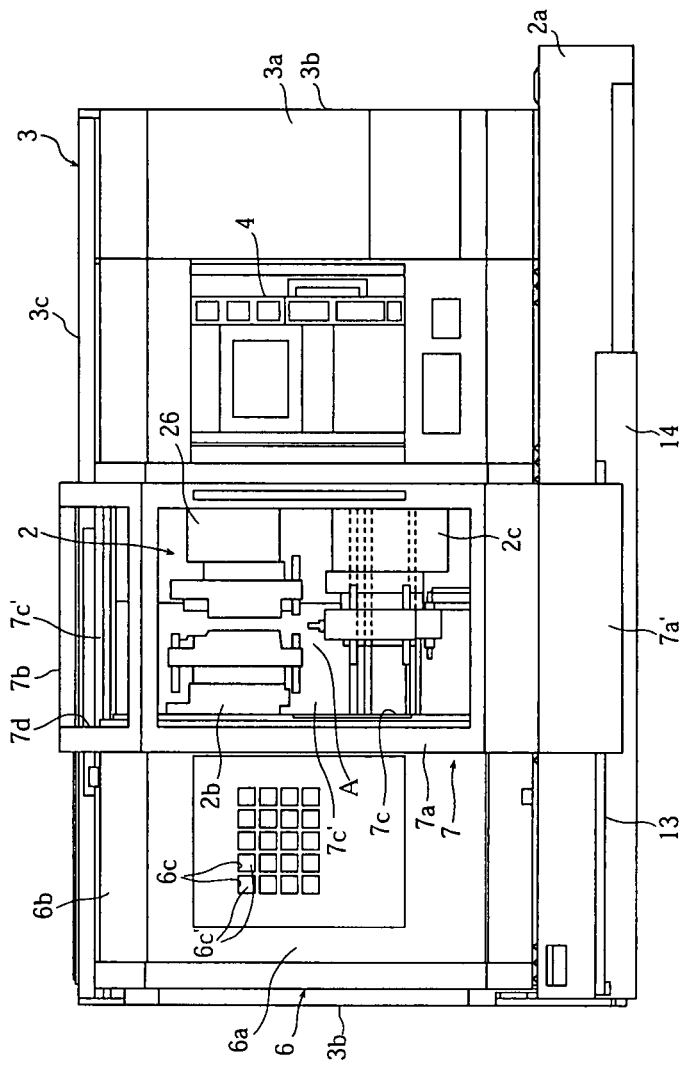
FIG. 2 is a front view of the lathe when not machining a workpiece.

Meanwhile, when observing the operating status(s) of the spindle or the tool posts 2b, 2c while rotating the spindle, the first door 6 is moved to the position when opened opening the machining-area opening 3e at the left side of the machining-area opening 3e and the second door 7 is moved to the position-in-use covering the machining-area opening 3e (refer to FIG. 2).

In this case, the second door 7 includes the vertical wall window 7c and the horizontal wall window 7d each having the large area, so that the inside status can be observed easily and surely through these windows. In addition, the second door 7 according to the present embodiment is supported by the front cover portion 3a and the top face cover portion 3c in a slidable manner in the right and left direction, easily allowing a work to cover the machining-area opening 3e by the second door 7 when not machining, a work to open the machining-area opening 3e when attaching/detaching the workpiece, and so forth. Note that, even when machining the workpiece, as long as a machining condition is, for example, a low-speed level not possibility causing the workpiece to jump out, it is possible to observe the machining state by covering the machining-area opening 3e with the second door 7.

Further, the second door 7 is disposed outside the first door 6, allowing the first door 6 and the second door 7 to be disposed at the same side in a movable manner without interfering each other, so that the above-described workability can be improved further. Specifically, for example, when both the doors are disposed to form the same plane, both the doors are restricted in view of a position to be disposed and a moving direction, and, for example, when the first door 6 is disposed on the left side of the machining-area opening 3e in a movable manner, the second door 7 is requisitely disposed on the right side thereof in the movable manner.

Further, the positions of the first door 6 and the second door 7 when opened are set on the same side of the machining-area opening 3e (for example, left side), so that the opposite side thereto over the machining-area opening 3e can be utilized, for example, as a space to dispose an operation panel 4 while providing both the first door 6 and the second door 7.

Note that the above-described embodiment assumes a so-called single sliding-type door in which the first door 6 and the second door 7 are moved to the same side, however, in the present invention, a so-called double-sliding door, in which the first door 6 and the second door 7 are moved to an opposite side each other, is also acceptable.

The invention may be embodied in other specific forms without departing from the spirit or essential characteristics thereof.

The present embodiments are therefore to be considered in all respects as illustrative and no restrictive, the scope of the invention being indicated by the appended claims rather than by the foregoing description, and all changes which come within the meaning and range of equivalency of the claims are therefore intended to be embraced therein.

What is claimed is:

1. A machine tool comprising:
a machine body for machining a workpiece;
a machine body cover surrounding a periphery of said machine body;
a machining-area opening formed in said machine body cover and opening a machining area of said machine body; and
a door device opening and closing said machining-area opening,
wherein said door device includes a first door to cover said machining-area opening when machining the workpiece and a second door disposed on an outer side of the first door and said second door being capable of covering said machining-area opening when not machining the workpiece, the second door being formed so as to allow observation of the machining area,
wherein the first door and the second door have respective substantially vertical wall portions, the vertical wall portions being arranged to overlap when viewed from a side of said machine body,
wherein the vertical wall portion of the second door includes a window portion larger than a window portion of the first door,
wherein the first door and the second door are arranged so as to be movable between a position-in-use where each of the first and second doors is covering said machining-area opening and a position when opened opening said machining-area opening, and
wherein during the machining, said machining-area opening is covered by the first door or by the first door and the second door, and during non-machining and during low-speed-rotation machining, said machining-area opening is covered only by the second door.

2. The machine tool according to claim 1,
wherein the first door and the second door are disposed so as to be slidable in a lateral direction.

3. The machine tool according to claim 2,
wherein the positions of the first door and the second door when opened are set on a same side with respect to said machining-area opening.

4. The machine tool according to claim 1,
wherein the positions of the first door and the second door when opened are set on a same side with respect to said machining-area opening.

5. The machine tool according to claim 1, wherein the window portion of the first door includes a plurality of window portions.

* * * * *